US005167938A

United States Patent [19]
Heaton et al.

[11] Patent Number: 5,167,938
[45] Date of Patent: Dec. 1, 1992

[54] PROCESS FOR STRONTIUM-82 SEPARATION

[75] Inventors: Richard C. Heaton; David J. Jamriska, Sr.; Wayne A. Taylor, all of Los Alamos, N. Mex.

[73] Assignee: United States Department of Energy, Washington, D.C.

[21] Appl. No.: 744,747

[22] Filed: Aug. 14, 1991

[51] Int. Cl.$^5$ .............................................. C01G 39/00
[52] U.S. Cl. ...................................... 423/2; 423/21.5; 423/22; 423/54; 423/63; 423/70; 423/87; 423/100; 423/112; 423/139; 423/155; 423/249; 252/626; 210/681
[58] Field of Search ................. 423/2, 54, 249, 22, 423/21.5, 63, 69, 70, 87, 100, 112, 139, 155; 252/626; 210/681

[56] References Cited

U.S. PATENT DOCUMENTS

| | | | |
|---|---|---|---|
| 3,122,414 | 2/1964 | Horner et al. | 423/10 |
| 3,154,500 | 10/1964 | Jansen, Jr. et al. | 252/631 |
| 3,173,757 | 3/1965 | Wheelright et al. | 423/7 |
| 3,218,123 | 11/1965 | Davis, Jr. et al. | 423/2 |
| 3,258,315 | 6/1966 | Schmitt | 423/157 |
| 3,333,919 | 8/1967 | Buckingham | 423/2 |
| 3,343,914 | 9/1967 | Bray | 423/2 |
| 3,399,030 | 8/1968 | Aubertin et al. | 423/2 |
| 3,694,369 | 9/1972 | Orlandini | 252/631 |
| 3,953,567 | 4/1976 | Grant et al. | 423/2 |
| 3,957,945 | 5/1976 | Grant et al. | 423/2 |
| 4,276,267 | 6/1981 | Bentley et al. | 423/2 |

Primary Examiner—Brooks H. Hunt
Assistant Examiner—Ngoclan T. Mai
Attorney, Agent, or Firm—Bruce H. Cottrell; Paul D. Gaetjens; William R. Moser

[57] ABSTRACT

A process for selective separation of strontium-82 and strontium-85 from proton irradiated molybdenum targets comprises dissolving the molybdenum target in a hydrogen peroxide solution to form a first solution containing ions selected from a group consisting of molybdenum, niobium, technetium, selenium, vanadium, arsenic, germanium, zirconium, rubidium, zinc, beryllium, cobalt, iron, manganese, chromium, strontium, and yttrium; passing the solution through a first cationic resin whereby ions selected from a group consisting of zinc, beryllium, cobalt, iron, manganese, chromium, strontium, yttrium a portion of zirconium and a portion of rubidium are selectively absorbed by the first resin; contacting the first resin with an acid solution to strip and remove the absorbed ions from the first cationic exchange resin to form a second solution; evaporating the second solution for a time sufficient to remove substantially all of the acid and water from the solution whereby a residue remains; dissolving the residue in a dilute acid to form a third solution; passing the third solution through a second cationic resin whereby the ions are absorbed by the second resin; contacting the second resin with a dilute sulfuric acid solution whereby the absorbed ions selected from the group consisting of rubidium, zinc, beryllium, cobalt, iron, manganese, chromium and zirconium are selectively removed from the second resin; and contacting the second resin with a dilute acid solution whereby the absorbed strontium ions are selectively removed.

6 Claims, 1 Drawing Sheet

PROCESS FOR STRONTIUM-82 SEPARATION

This invention is the result of a contract with the Department of Energy (Contract No. W-7405-ENG-36).

FIELD OF THE INVENTION

The present invention relates to the field of selective separation of various radioisotopes. More particularly, the present invention relates to the selective separation of strontium isotopes, e.g., strontium-82 and strontium-85, from an irradiated molybdenum target. Other radioisotopes, such as zirconium-88, rubidium-83, and yttrium-88 can also be selectively recovered in this process.

BACKGROUND OF THE INVENTION

Strontium-82 has a half-life of about 25 days and decays by pure electron capture to the ground state of its 75-second daughter, rubidium-82. Rubidium-82 in turn decays by 95% positron emission and 5% electron capture to stable krypton-82 while exhibiting several prominent gamma rays. The availability of the long-lived parent, strontium-82, is of significant interest for biomedical studies because of its generation of the short-lived alkali metal activity. The useful shelf-life is determined by the activity of the strontium-82, while the short half-life of the rubidium-82 minimizes the radiation dose to the patient. With a suitable positron imaging device, rubidium-82 has considerable usage in medical applications where repeated, rapid, dynamic blood-flow information is needed, for example, in the investigation of coronary occlusions, cardiac output, arteriography, or tumor vascularity.

U.S Pat. No. 3,957,945 describes the chemical isolation of strontium-82 from an irradiated molybdenum target by a multi-step process including dissolution of the target in a hydrogen peroxide solution, reaction of the solution with a base such as ammonium hydroxide to selectively precipitate and separate hydrous molybdenum oxides containing large amounts of Zr and Y, reaction of the remaining solution with a lead compound such as lead nitrate to form a strontium-82 containing solid lead molybdenate species, reaction of the strontium-82 containing lead molybdenate species with a mixture of dilute HCl and bis-(2-ethylhexyl) phosphoric acid in toluene whereby both an aqueous and an organic layer are formed, adjusting the pH of the aqueous layer to basic followed by subsequent reaction of the alkaline solution with hydrogen sulfide to selectively precipitate and separate lead sulfide, acidification of the remaining solution to selectively precipitate and separate molybdenum sulfide, adjusting the pH of the remaining solution to about 6.0 followed by passage through an ion exchange column containing hydrous zirconium oxide and collection of a strontium-82 solution.

U.S. Pat. No. 4,276,267 describes the chemical isolation of strontium isotopes from an irradiated molybdenum target by another multi-step process including dissolving the target in a hydrogen peroxide solution, passing the solution through a cation exchange column to separate cationic species from anionic and neutral species, forming anionic chlorocomplexed species, separating the anionic chlorocomplexed species from the solution by anionic exchange, adjusting the pH of the solution to from about 0 to about 1, extracting selected ions from the solution with an organophosphorus solvent whereby the strontium ions remain in the aqueous phase, adjusting the pH of the solution to greater than about 10, passing the solution through a chelating resin whereby the strontium ions are preferentially adsorbed, and eluting the chelating resin with dilute hydrochloric acid to remove the strontium ions.

Each of these previous processes involved the use of one or more organic solvents in an extraction stage for the selective separation of the strontium. Eliminating the need for these materials in the separation is environmentally desirable as any radioactive waste solution, i.e., mixed hazardous waste, can be minimized.

Accordingly, it is an object of this invention to provide an improved process for the recovery of strontium isotopes, i.e., strontium-82 and strontium-85 from irradiated molybdenum targets and for the recovery of other desirable radioisotopes, e.g., zirconium-88, rubidium-83, and yttrium-88, from the molybdenum targets.

It is a further object of this invention to provide an organic solvent-free process for recovery of strontium-82 and strontium-85.

It is a still further object of this invention to provide an organic solvent-free process for recovery of zirconium-88, rubidium-83, and yttrium-88.

SUMMARY OF THE INVENTION

To achieve the foregoing and other objects, and in accordance with the purposes of the present invention, as embodied and broadly described herein, the present invention provides a process for selective separation of strontium-82 and strontium-85 from proton irradiated molybdenum targets including dissolving the proton irradiated molybdenum target in a hydrogen peroxide solution to form a first ion-containing solution, contacting the first ion-containing solution with a first cationic exchange resin whereby ions selected from the group consisting of molybdenum, niobium, technetium, selenium, vanadium, arsenic, germanium, zirconium and rubidium remain in the first ion-containing solution while ions selected from the group consisting of rubidium, zinc, beryllium, cobalt, iron, manganese, chromium, strontium, yttrium and zirconium are selectively adsorbed by the first cationic exchange resin, contacting the first cationic exchange resin with an acid solution capable of stripping adsorbed ions from the first cationic exchange resin whereby the adsorbed ions are removed from the first cationic exchange resin to form a second ion-containing solution, evaporating the second ion-containing solution for time sufficient to remove substantially all of the acid and water from the second ion-containing solution whereby a residue remains, dissolving the residue from the evaporated second ion-containing solution in a dilute acid to form a third ion-containing solution, said third ion-containing solution having an acid molarity adapted to permit said ions to be adsorbed by a cationic exchange resin, contacting the third ion-containing solution with a second cationic resin whereby the ions are adsorbed by the second cationic exchange resin, contacting the second cationic exchange resin with a dilute sulfuric acid solution whereby the adsorbed ions selected from the group consisting of rubidium, zinc, beryllium, cobalt, iron, manganese, chromium, and zirconium are selectively removed from the second cationic exchange resin while strontium ions and yttrium ions remain adsorbed by the second cationic exchange resin, and contacting the second cationic exchange resin with a dilute acid solution whereby the adsorbed strontium ions are selectively removed while the yttrium ions remain adsorbed.

The present process further provides a process for selective separation of zirconium-88 from proton irradiated molybdenum targets including dissolving the molybdenum target in a hydrogen peroxide solution to form a first ion-containing solution, passing the first ion-containing solution through a first cationic exchange resin whereby ions selected from the group consisting of molybdenum, niobium, technetium, selenium, vanadium, arsenic, germanium, zirconium and rubidium remain in the first ion-containing solution while ions selected from the group consisting of rubidium, zinc, beryllium, cobalt, iron, manganese, chromium, strontium, yttrium and zirconium are selectively adsorbed by the first cationic exchange resin, contacting the first cationic exchange resin with an acid solution capable of stripping adsorbed ions from the first cationic exchange resin whereby the adsorbed ions are removed from the first cationic exchange resin to form a second ion-containing solution, evaporating the second ion-containing solution for time sufficient to remove substantially all of the acid and water from the second ion-containing solution whereby a residue remains, dissolving the residue from the evaporated second ion-containing solution in a dilute acid to form a third ion-containing solution, said third ion-containing solution having an acid molarity adapted to permit said ions to be adsorbed by a cationic exchange resin, contacting the third ion-containing solution with a second cationic exchange resin whereby the ions are adsorbed by the second cationic exchange resin, contacting the second cationic exchange resin with a dilute sulfuric acid solution whereby the adsorbed ions selected from the group consisting of rubidium, zinc, beryllium, cobalt, iron, manganese, chromium, and zirconium are selectively removed from the second cationic exchange resin to form a fourth ion-containing solution, adjusting the acid molarity of the fourth ion-containing solution to within a range whereat an anionic exchange resin is capable of adsorbing zirconium ions and niobium ions, contacting the fourth ion-containing solution with an anionic exchange resin whereby zirconium and niobium are adsorbed by the anionic exchange resin while the remainder of the ions remain in solution, contacting the anionic exchange resin with an acid solution capable of stripping zirconium from the anionic exchange resin whereby the adsorbed zirconium ions are selectively removed.

The present process still further provides a process for selective separation of rubidium-83 from proton irradiated molybdenum targets including dissolving a proton irradiated molybdenum target in a hydrogen peroxide solution to form a first ion-containing solution, contacting the first ion-containing solution with a first cationic exchange resin whereby ions selected from the group consisting of molybdenum, niobium, technetium, selenium, vanadium, arsenic, germanium, zirconium and rubidium remain in the first ion-containing solution while ions selected from the group consisting of rubidium, zinc, beryllium, cobalt, iron, manganese, chromium, strontium, yttrium and zirconium are selectively adsorbed by the first cationic exchange resin, contacting the first cationic exchange resin with an acid solution capable of stripping adsorbed ions from the first cationic exchange resin whereby the adsorbed ions are removed from the first cationic exchange resin to form a second ion-containing solution, evaporating the second ion-containing solution for time sufficient to remove substantially all of the acid and water from the second ion-containing solution whereby a residue remains, dissolving the residue from the evaporated second-ion containing solution in a dilute acid to form a third ion-containing solution, said third ion-containing solution having an acid molarity adapted to permit said ions to be adsorbed by a cationic exchange resin, contacting the third ion-containing solution with a second cationic exchange resin whereby the ions are adsorbed by the second cationic exchange resin, contacting the second cationic exchange resin with a dilute sulfuric acid solution whereby the adsorbed ions selected from the group consisting of rubidium, zinc, beryllium, cobalt, iron, manganese, chromium, and zirconium are selectively removed from the second cationic exchange resin to form a fourth ion-containing solution, adjusting the acid molarity of the fourth ion-containing solution to within a range whereat an anionic exchange resin is capable of adsorbing said ions, contacting the fourth ion-containing solution with an anionic exchange resin whereby the zirconium and niobium ions are adsorbed by the anionic exchange resin and a fifth ion-containing solution is formed, contacting the fifth ion-containing solution with a third cationic exchange resin whereby the ions are adsorbed by the third cationic exchange resin, and, contacting the third cationic exchange resin with a dilute hydrochloric acid solution whereby the adsorbed rubidium-83 ions are selectively removed from the third cationic exchange resin.

The present process also provides a process for selective separation of yttrium-88 from proton irradiated molybdenum targets including dissolving a proton irradiated molybdenum target in a hydrogen peroxide solution to form a first ion-containing solution, contacting the first ion-containing solution with a first cationic exchange resin whereby ions selected from the group consisting of molybdenum, niobium, technetium, selenium, vanadium, arsenic, germanium, zirconium and rubidium remain in the first ion-containing solution while ions selected from the group consisting of rubidium, zinc, beryllium, cobalt, iron, manganese, chromium, strontium, yttrium and zirconium are selectively adsorbed by the first cationic exchange resin, contacting the first cationic exchange resin with an acid solution capable of stripping adsorbed ions from the first cationic exchange resin whereby the adsorbed ions are removed from the first cationic exchange resin to form a second ion-containing solution, evaporating the second ion-containing solution for time sufficient to remove substantially all of the acid and water from the second ion-containing solution whereby a residue remains, dissolving the residue from the evaporated second-ion containing solution in a dilute acid to form a third ion-containing solution, said third ion-containing solution having an acid molarity adapted to permit said ions to be adsorbed by a cationic exchange resin, contacting the third ion-containing solution with a second cationic exchange resin whereby the ions are adsorbed by the second cationic exchange resin, contacting the second cationic exchange resin with a dilute sulfuric acid solution whereby the adsorbed ions selected from the group consisting of rubidium, zinc, beryllium, cobalt, iron, manganese, chromium, and zirconium are selectively removed from the second cationic exchange resin to form a fourth ion-containing solution, adjusting the acid molarity of the fourth ion-containing solution to within a range whereat an anionic exchange resin is capable of adsorbing zirconium ions and niobium ions, contacting the fourth ion-containing solution with an anionic exchange resin whereby zirconium and niobium are adsorbed by the anionic exchange resin while the remainder of the ions remain in solution, contacting the anionic resin with an acid solution capable of stripping zirconium from the anionic exchange resin whereby the adsorbed zirconium ions are selectively removed as a fifth ion-containing solution, maintaining said fifth ion-containing solution for time sufficient to allow formation of yttrium-88 by radioactive decay of zirconium-88, adjusting the acid molarity of the fifth ion-containing solution to within a range whereat an cationic exchange resin is capable of adsorbing yttrium ions, contacting the fifth ion-containing solution with a third cationic exchange resin whereby the yttrium ions are adsorbed by the third cationic exchange resin, recovering said yttrium-88 ions from said resin.

DETAILED DESCRIPTION

Figure 1:
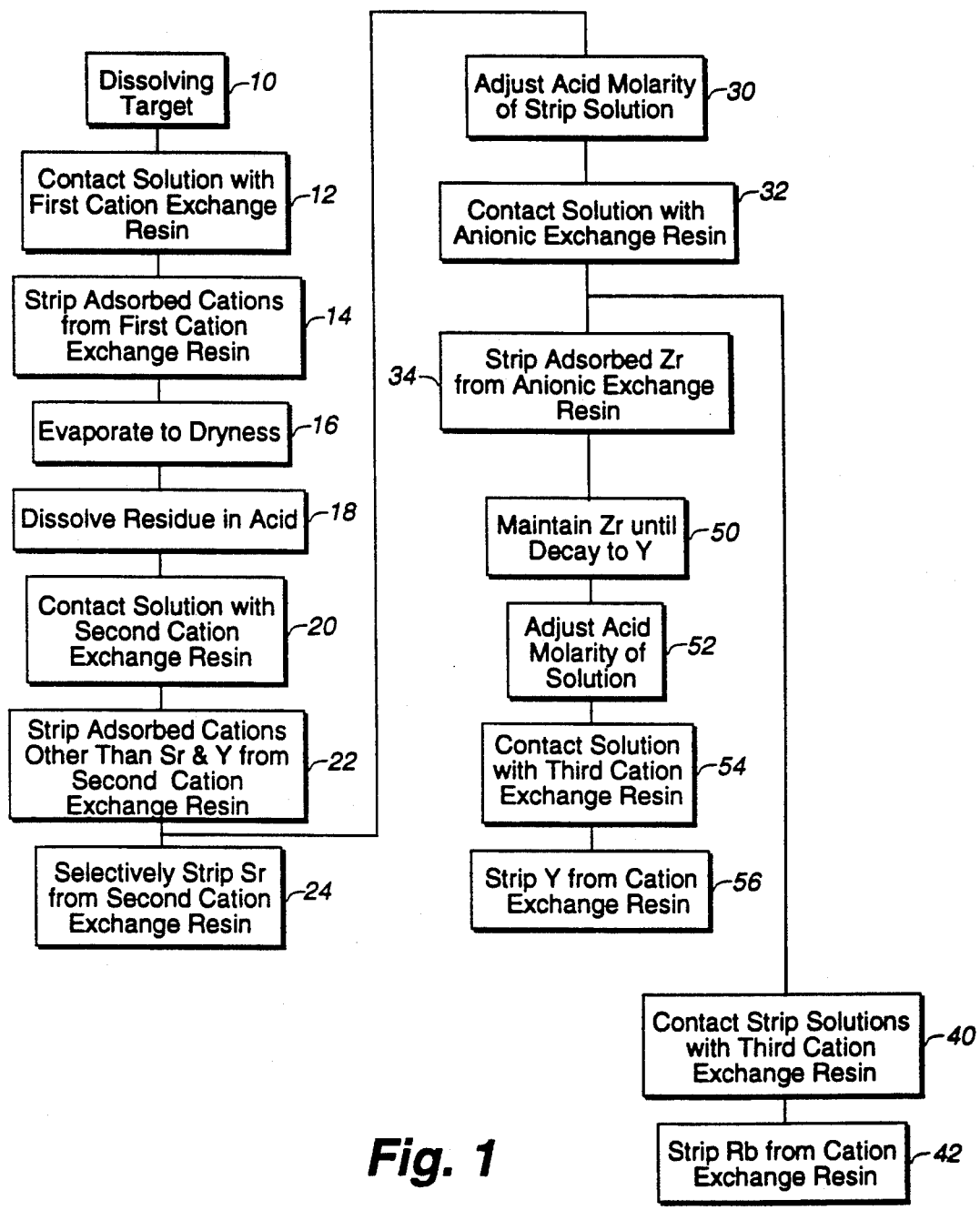
FIG. 1 The drawing is a flow sheet illustrating the various steps of the present invention.

The present invention concerns the selective separation of radioisotopes, including strontium-82, strontium-85, zirconium-88, yttrium-88, rubidium-83, rubidium-84 and rubidium-85, from a previously irradiated target, e.g., a proton irradiated molybdenum target. Such a process can produce Curie quantities of such radioisotopes for use in the fields of nuclear chemistry and/or nuclear medicine.

As a starting material in the present process, a molybdenum target is irradiated by energetic protons having energies sufficient to generate a large number of isotopes by spallation reactions, generally energies greater than about 200 MeV, more preferably from about 600 MeV to about 800 MeV. In order to produce the desired Curie quantities of the radioisotopes, the molybdenum target should have a weight of at least about 100 grams (g).

One method of irradiation is by proton bombardment of the molybdenum target. Such proton bombardment can be accomplished by inserting the target into a linear accelerator beam at a suitable location whereby the target is irradiated at an integrated beam intensity of from about 30 milliampere-hours (mA-hr) to about 1000 mA-hr. The molybdenum target can consist of a number of metal foils sandwiched together or can be a single metal piece generally up to about 0.8 inches in thickness. After the irradiation of the molybdenum target, the target is generally allowed to decay for from about 7 to about 14 days whereby unwanted short-lived isotopes will be substantially removed.

In the selective separation of the present invention illustrated in FIG. 1, the irradiated target is initially dissolved at 10 into a hydrogen peroxide solution by either a batch or continuous process. Preferably, this dissolution is by a batch process as this greatly reduces the time necessary for the dissolution. The hydrogen peroxide solution can be of any convenient concentration, although concentrated solutions, i.e., solution concentrations greater than about 20 percent by weight hydrogen peroxide, are preferred for quicker dissolution. A hydrogen peroxide solution of about 30 percent by weight hydrogen peroxide is especially preferred for the dissolution. After the target is dissolved, additional hydrogen peroxide is generally added until the solution is a pale yellow color indicating that the oxidation state of the molybdenum is within a preferred range, i.e., within the range of neutral and anionic molybdenum species whereby such species will pass through a cationic exchange column.

The resultant solution is then contacted with a cation exchange resin at 12, preferably by passing the solution through a bed of the cation exchange resin. The cation exchange resin is preferably a strong acid resin and can be, for example, a strong acid resin such as AG 50 W-X8, available from Bio-Rad Laboratories. Generally, the cations including zinc, beryllium, cobalt, iron, manganese, chromium, strontium, yttrium, a portion of the rubidium, and a portion of the zirconium will be adsorbed or remain on the cation exchange resin while other ions including molybdenum, niobium, technetium, selenium, vanadium, arsenic, germanium, a portion of the zirconium and a portion of the rubidium remain in the solution and can be selectively separated from the cation exchange resin. Residual solution can be removed from the resin by washing or rinsing with a hydrogen peroxide solution or water. The mesh size of the cation exchange resin can be from about 50 mesh to about 400 mesh, more preferably from about 100 mesh to about 200 mesh.

The adsorbed cations can then be stripped from the resin at 14 by contacting the resin with an acid solution capable of stripping adsorbed ions from this first cationic exchange resin, including, e.g., the inorganic acids such as hydrochloric acid, sulfuric acid, and nitric acid. Hydrochloric acid is generally preferred as the acid for this stripping step. Generally, the acid solution can be from about 4 Molar (M) hydrochloric acid to about 8 Molar hydrochloric acid, preferably about a 6 M hydrochloric acid. In a preferred operation utilizing a bed of the cation exchange resin, hydrochloric acid is passed through the bed of the resin containing the adsorbed cations to separate the cations from the resin. The amount of the hydrochloric acid used for stripping is preferably minimized and removal of the cations from the resin can be monitored by analysis of successive stripping fractions.

After the cations are stripped from the resin, substantially all of the acid solution used for stripping is removed from the resultant solution by evaporation of the liquids at 16. Preferably, the solution is evaporated to dryness or near dryness leaving a solid residue. The resultant residue can then be redissolved at 18 in a small portion of dilute acid with the pH of this resultant solution chosen within a range whereat a subsequent cationic exchange resin can adsorb the ions from this solution. Generally, the dilute acid can be, e.g., about 25 milliliters of from about 0.05 M to about 0.2 M hydrochloric acid, preferably about 0.1 M hydrochloric acid. Optionally, dilute nitric acid or dilute sulfuric acid may be used to redissolve the residue.

The resultant solution following redissolution of the residue is then contacted with a cation exchange resin at 20, generally a second fresh cation exchange resin, preferably by passing the solution through a bed of the cation exchange resin. As with the previous cation exchange step, the cation exchange resin is preferably a strong acid resin and can be, for example, a strong acid resin such as AG 50 W-X8, available from Bio-Rad Laboratories. The cations within the solution are readsorbed by this second cation exchange resin. After washing or rinsing the resin with water, the resin is contacted with a dilute sulfuric acid solution, generally from about 0.1 M to about 1 M sulfuric acid, preferably about 0.5 M sulfuric acid, to selectively strip cations from the resin at 22. Preferably, the sulfuric acid is passed in successive portions through a bed of the resin containing the adsorbed cations. The dilute sulfuric acid solution will generally strip all of the radioisotopes of rubidium, zinc, beryllium, cobalt, iron, manganese, chromium, and zirconium as well as a minor portion of the strontium. The stripping of these cations can be monitored by analysis of the successive stripping fractions. The present process may optionally be conducted in a single exchange column with appropriate rinsing of the cation exchange resin between stages, rather than changing to a fresh second cation exchange resin.

The remaining cation exchange resin can then be washed or rinsed with a portion of water to remove any residual sulfuric acid within the resin bed. At this point, the remaining cation exchange resin will have both strontium cations and yttrium cations adsorbed upon the resin. The strontium cations can then be selectively removed from the resin at 24 by contacting the resin with a dilute acid solution, e.g., dilute hydrochloric acid.

Recovery of zirconium from the irradiated target follows the process for the selective separation of strontium until the dilute sulfuric acid solution strips all of the radioisotopes of rubidium, zinc, beryllium, cobalt, iron, manganese, chromium, and zirconium as well as a minor portion of the strontium from the second cation exchange resin at 22. The resultant sulfuric acid solution from this stripping is first diluted to adjust the sulfuric acid molarity of the solution at 30 to within a range whereat an anionic exchange resin is capable of adsorbing zirconium ions, generally a molarity of from about 0.1 Molar to about 0.3 Molar, and then contacted with, preferably passed through, such an anionic exchange resin at 32 whereby zirconium-88 and niobium are adsorbed by the anion exchange resin while the remainder of the ions remain in solution and are selectively separated. The anion exchange resin is preferably a strongly basic anion resin and can be, for example, a resin such as AG-1 X8, available from Bio-Rad Laboratories.

The anion exchange resin including the adsorbed zirconium and niobium is then contacted with a dilute acid solution at 34 whereby the adsorbed zirconium-88 ions are selectively removed from the resin. The dilute acid solution can generally be any inorganic or organic acid, preferably hydrochloric acid or sulfuric acid, of generally more than about 2 Molar but less than about 6 Molar.

Recovery of rubidium from the irradiated target follows the process for the selective separation of zirconium until the dilute sulfuric acid solution is contacted with the anionic exchange resin. The remaining solution after contact with the anionic exchange resin at 32 is then contacted with a cationic exchange resin at 40, preferably a fresh cationic exchange resin whereby the remaining ions are adsorbed by the cationic exchange resin. The cationic exchange resin can be any of the materials previously described for the other cation exchange steps. The rubidium ions are then selectively stripped from the cationic exchange resin at 42 by contact with a dilute hydrochloric acid solution, generally from about 0.5 Molar to about 1.0 Molar.

Recovery of yttrium from the irradiated target follows the process for the selective separation of zirconium until the recovery of the zirconium. The zirconium solution is then allowed to stand for time sufficient to allow the growth of the desired yttrium isotope at 50 by the radioactive decay of the zirconium isotope. Generally, sufficient yttrium is formed after about 100 days to allow for separation. Then, the acid molarity of the solution is adjusted at 52 to within a range whereat an cationic exchange resin is capable of adsorbing yttrium ions, generally about 1.0 Molar. The molarity-adjusted solution is contacted a cationic exchange resin at 54 whereby the yttrium ions are adsorbed and the yttrium-88 ions are selectively recovered at 56 from said resin with a hydrochloric acid solution, generally from about 4.0 Molar to about 6.0 Molar. Again, the cationic exchange resin can be any of the materials previously described for the other cation exchange steps.

The present invention is more particularly described in the following examples which are intended as illustrative only, since numerous modifications and variations will be apparent to those skilled in the art.

EXAMPLE 1

A 364 gram (g) molybdenum target consisting of seven stacks of molybdenum metal foils, each stack weighing approximately 52 g and each foil of greater than 99.9 percent purity, was irradiated with 600-800 MeV protons at an integrated beam intensity of 590 mA-hr. This yielded approximately 250 Curies of induced gamma activities, as measured 10 days after the end of the bombardment. Of the various activities produced, a combined 31 Curies of activity were from the strontium-82 and strontium-85 isotopes. Other isotopes and the Curies of activity included beryllium-7 (0.3 Curies), vanadium-48 (1 Curie), manganese-54 (0.04 Curies), cobalt-58 (0.5 Curie), iron-59 (0.04 Curie), zinc-65 (0.5 Curie), arsenic-73 (13 Curies), arsenic-74 (9 Curies), selenium-75 (29 Curies), rubidium-83 (15 Curies), rubidium-84 (3 Curies), yttrium-88 (8 Curies), zirconium-88 (12 Curies), zirconium-95 (8 Curies), niobium-91 m (23 Curies), niobium-95 (80 Curies), and technetium-95 m (4 Curies). The irradiated molybdenum target was dissolved batchwise (400 milliliters (ml) per batch) in a total of 9.3 liters (l) of an unstabilized 30% by weight hydrogen peroxide solution.

Excess hydrogen peroxide was added until the color of the solution changed from orange to a pale yellow. The resulting solution was then passed through 50 ml of cation exchange resin (a strong acid resin available from Bio-Rad Laboratories as AG 50 W-X8). The cations including rubidium-83, zinc-65, beryllium-7, cobalt-58, iron-59, manganese-54, chromium-51, strontium-82, strontium-85, yttrium-88, and zirconium-88 were adsorbed by the resin while the remaining radioisotopes remained in the solution. The cation exchange resin was then rinsed with a clean hydrogen peroxide solution followed by water.

The cations were stripped from the cation exchange resin by passing 500 ml of 6 Molar (M) hydrochloric acid through the resin bed. The resultant solution was evaporated to dryness and the residue was dissolved in 25 ml of 0.1 M hydrochloric acid. This solution was then passed through a second column of cation exchange resin (strong acid resin AG 50 W-X8) and the cations were again adsorbed.

After washing the column with water, the resin was eluted with five 50 ml portions of 0.5 M sulfuric acid. This separated essentially all of the radioisotopes of beryllium-7, manganese-54, cobalt-58, iron-59, zinc-65, rubidium-83, zirconium-88, and about 15 percent of the strontium-82 and strontium-85. The resin was washed with 50 ml of water to remove any excess sulfate and the remaining strontium was then stripped with 1 M hydrochloric acid in successive 25 ml portions. Nine total fractions of solution were collected. The fractions were assayed by gamma ray spectroscopy and the pure strontium containing solutions were combined. The total amount of purified strontium (about 99.4 percent pure) was about 25 Curies of strontium for a yield of about 80 percent.

Using the described separation steps, the strontium-82 and strontium-85 radioisotopes can be obtained in relatively pure form. One measure of the purity of the strontium product with respect to particular contaminating isotopes is given by the decontamination factor $K_{df}$, which is defined as:

$$K_{df} = R_o/R_i$$

where
$R_o = [A_{oN}/A_{oSr}]$ original and
$R_i = [A_{oN}/A_{oSr}]$ final.

The quantity, $A_{oN}$, is the activity at time $t_o$ of a contaminating isotope, and $A_{oSr}$ is the activity at time $t_o$ of strontium-82. For a particular element, the decontamination factor is a measure of how effectively that element was removed with respect to strontium-82 present in the original solution being purified. Experimentally obtained decontamination factor values for various elements that are produced with the strontium-82 during the irradiation are presented in Table 1.

TABLE 1

Decontamination Factors for Various Radioisotopes

Be $>10^5$
V $>10^5$
Mn $>10^5$
Co $>10^5$
Fe $>10^5$
Zn $>10^5$
As $>10^5$
Se $>10^5$
Rb $>10^5$
Y 126
Zr $>10^5$
Nb $>10^5$
Tc $>10^5$

EXAMPLE 2

A 100 ml sample of 0.5 M sulfuric acid solution from the sulfuric acid elution stage of Example 1 was diluted with distilled water to 500 ml total volume. This solution was passed through 10 ml of anion exchange resin (a strong acid resin available from Bio-Rad Laboratories as AG1x8) in a column. The column was then washed with 50 ml of distilled water, which was then added to the initial 500 ml solution, and the column eluted with 200 ml of 1.5 M sulfuric acid. The resultant solution contained as a principal component zirconium-88 and minor amounts of niobium-95 (a decay product of zirconium-95) and yttrium-88. The majority of niobium-95 remained on the resin within the column and was discarded. The substantially pure zirconium-88 can then be used to generate carrier-free yttrium-88.

EXAMPLE 3

The eluate from Example 2 was allowed to sit for a period of time sufficient to allow the formation of yttrium-88 from the decay of the zirconium-88. The solution was diluted to 600 ml with distilled water and the resultant solution was passed through 10 ml of cation exchange resin (a strong acid resin available from Bio-Rad Laboratories as AG50x8) in a column. The zirconium-88 and niobium-95 were not adsorbed by the resin and the solution retained for future production of yttrium-88. Yttrium-88 was adsorbed by the resin. The column was then washed with a portion of distilled water and the column eluted with 6 M hydrochloric acid to recover a solution of yttrium-88.

EXAMPLE 4

The initial discard solution from Example 2 (about 550 ml) was passed through 15 ml of cation exchange resin (Bio-Rad Laboratories AG50x8) in a column. The column was then washed with a portion of distilled water. The rubidium and other radionuclides were adsorbed by the resin. Elution of the column was carried out with 50 ml portions of 1 M hydrochloric acid. Over 95 percent of the rubidium was then desorbed from the resin prior to desorption of any other radionuclides began, after from about 100 to about 150 ml of eluate. The yttrium-88 remained on the resin within the column.

Although the present invention has been described with reference to specific details, it is not intended that such details should be regarded as limitations upon the scope of the invention, except as and to the extent that they are included in the accompanying claims.

What is claimed is:

1. A process for selective separation of strontium-82 and strontium-85 from proton irradiated molybdenum targets comprising:

dissolving a proton irradiated molybdenum target in a hydrogen peroxide solution to form a first ion-containing solution;

contacting the first ion-containing solution with a first cationic exchange resin whereby ions selected from the group consisting of molybdenum, niobium, technetium, selenium, vanadium, arsenic, germanium, a portion of the zirconium and a portion of the rebidium remained in the first ion-containing solution while ions selected from the group consisting of a portion of the rubidium, zinc, beryllium, cobalt, iron, manganese, chromium, strontium, yttrium and a portion of the zirconium are selectively adsorbed by the first cationic exchange resin;

contacting the first cationic exchange resin with an acid solution capable of stripping adsorbed ions from the first cationic exchange resin whereby the adsorbed ions are removed from the first cationic exchange resin to form a second ion-containing solution;

evaporating the second ion-containing solution for time sufficient to remove substantially all of the acid and water from the second ion-containing solution whereby a residue remains;

dissolving the residue from the evaporated second ion-containing solution in a dilute acid to form a third ion-containing solution, said third ion-containing solution having an acid molarity adapted to permit said ions to be adsorbed by a cationic exchange resin;

contacting the third ion-containing solution with a second cationic exchange resin whereby the ions are adsorbed by the second cationic exchange resin;

contacting the second cationic exchange resin with a dilute sulfuric acid solution whereby the adsorbed ions selected from the group consisting of the portion of rubidium, zinc, beryllium, cobalt, iron, manganese, chromium, and the portion of zirconium are selectively removed from the group consisting of strontium and yttrium remain adsorbed on the second cationic exchange resin; and, contacting the second cationic exchange resin with a dilute acid solution capable of selectively separating the adsorbed strontium ions from the second cationic exchange resin white yttrium ions remain adsorbed on the second cationic exchange resin.

2. The process of claim 1 wherein said acid solution capable of stripping adsorbed ions from the first cationic exchange resin is a hydrochloric acid solution of from about 4 Molar to about 8 Molar.

3. The process of claim 1 wherein the dilute acid for dissolving the residue from the evaporated second ion-containing solution is hydrochloric acid of less than about 0.2 Molar.

4. The process of claim 1 wherein said dilute sulfuric acid solution contacted with the second cationic exchange resin is from about 0.1 Molar to about 0.5 Molar.

5. The process of claim 1 wherein said dilute acid solution capable of selectively separating the adsorbed strontium ions from the second cationic exchange resin is from about 0.5 Molar to about 1.0 Molar hydrochloric acid.

6. The process of claim 1 wherein said first cationic exchange resin and said second cationic exchange resin are each selected from the group of strong acid resins.

* * * * *